United States Patent [19]

Fandel

[11] 4,348,043
[45] Sep. 7, 1982

[54] DISENGAGING APPARATUS

[75] Inventor: Joseph N. Fandel, San Diego, Calif.

[73] Assignee: Whittaker Corporation, Los Angeles, Calif.

[21] Appl. No.: 159,826

[22] Filed: Jun. 16, 1980

[51] Int. Cl.³ .............................................. B66C 1/34
[52] U.S. Cl. .................................. 294/83 R; 114/378
[58] Field of Search ...................... 294/75, 83 R, 83 A, 294/83 AB; 9/43-45; 24/230.5 R, 232 R, 232 G, 241 P, 241 PP, 242; 114/230, 249, 252

[56] References Cited

U.S. PATENT DOCUMENTS

| | | | |
|---|---|---|---|
| 99,671 | 2/1870 | Havermale | 294/83 R |
| 1,813,294 | 7/1931 | Hunt | 294/83 R |
| 2,443,629 | 6/1948 | Matuszewski | 294/83 R X |
| 2,714,731 | 8/1955 | Binmore | 294/84 X |
| 3,046,598 | 7/1962 | Daugherty | 294/83 R X |
| 3,109,676 | 11/1963 | Mercer | 294/84 |
| 4,281,867 | 8/1981 | Kariagin | 294/83 R |

Primary Examiner—Johnny D. Cherry
Attorney, Agent, or Firm—Henry M. Bissell

[57] ABSTRACT

Disengaging apparatus including a hook having its pivot point and its engaging point substantially vertically aligned, being positioned between a pair of plates and having an integral counterweight extending laterally from the engaging point. A first link is attached at one end to the lateral extension and at the other end to the first end of a second link which rotates about a fixed point. The links have a first extended position under a load and rotate to a second position, thereby rotating a constant-radius engaging surface of the hook about its center at the pivot point of the hook in light or no load situations. Additionally, a stop and locking members may be provided to prevent accidental release of the hook.

18 Claims, 5 Drawing Figures

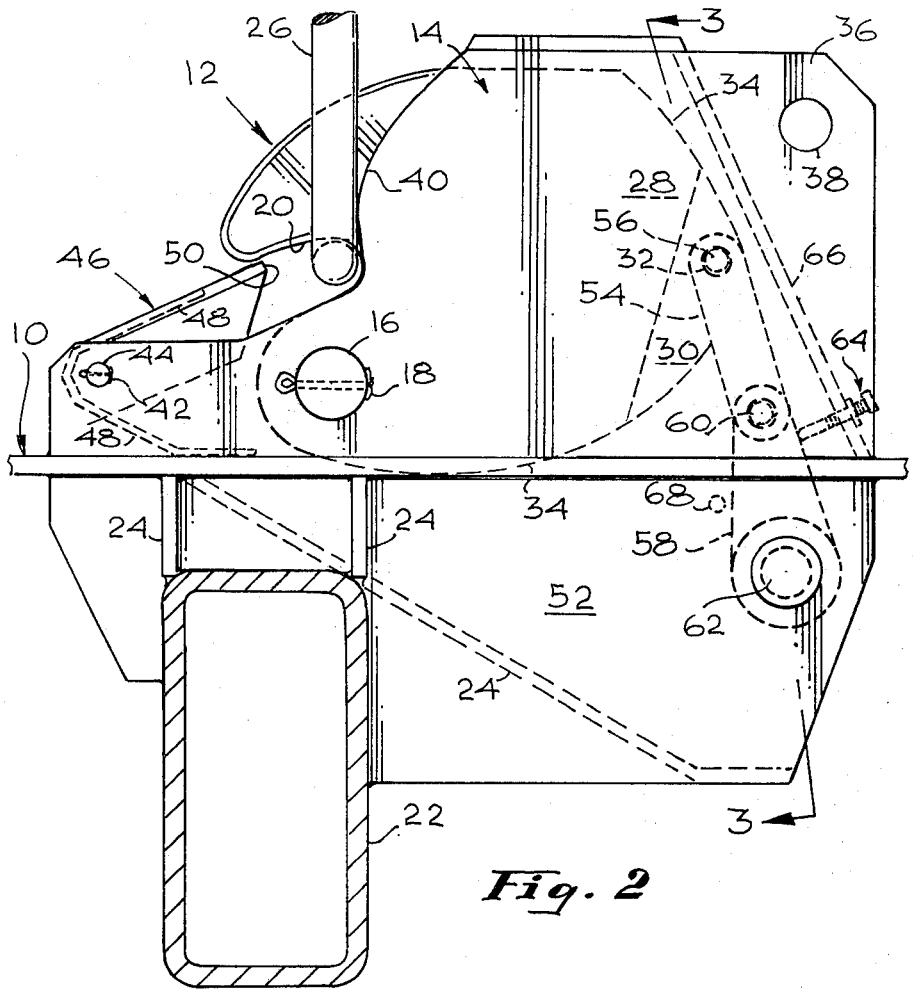
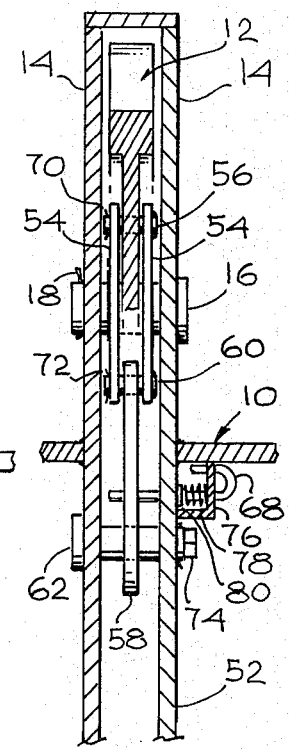
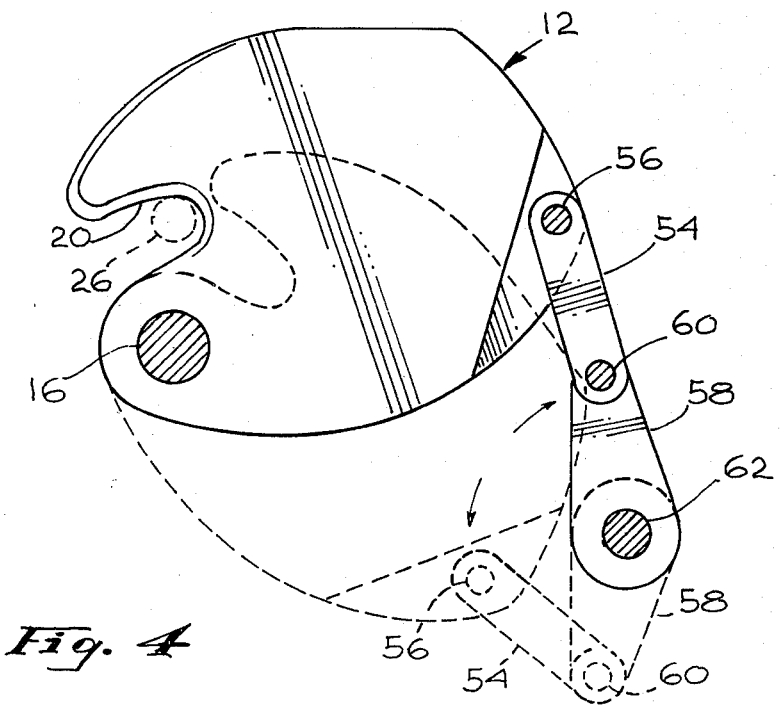

DISENGAGING APPARATUS

BACKGROUND OF THE INVENTION

1. Field of the Invention

The present invention relates to hooking and similar apparatus utilized as connections, for example, for cables. More particularly, the present invention relates to the cable connection for supporting, and eventually releasing, equipment such as survival capsules (a form of lifeboat common on oil well platforms at sea).

2. Description of the Prior Art

Numerous hooks have been designed and are used in industry at the present time. These often take the form of large hooks formed of steel, and having a spring-biased second piece which closes the open end of the hook to prevent release of the hook during operation.

Particularly in heavy industry, military and maritime situations, hooks are provided on a piece of equipment in order to make it more mobile, or to allow for it to be transferred from location to location. In these types of circumstances, large cranes and the like are utilized, and the chain or cable of the crane is provided with a large loop or ring which is to be engaged with the piece of equipment to be moved. In this type of circumstance, depending upon the particular use, it may be desirable to have a hook which can be opened either under full load, or without load. This type of hook is in use in industry, in that the industry does provide hooks which are positively locked under full load but, as a result, are not designed to open under no load conditions. In the alternative, the prior art also provides for hooks which will either automatically, or with very simple operation, open when no load is applied, but generally this type of hook is not easy to open in a loaded condition.

One of the common forms of hook available in the industry is the type which, under load, can be opened by use of a long line, chain or other device which actuates a releasing mechanism, and releases the hook when it is under load. In the other form, the action of releasing of the load by placement or by other means automatically releases the hook, and thus terminates the connection between the cable and the device being lifted. The disadvantage of the first form is that external action is required, and that the hooks are not easy to set or release when not under load. The disadvantage of the second form is that it remains locked in emergency situations when it is under load, and thus can present a significant safety risk. Therefore, there is a significant need in the industry to provide an attaching device which can be set to release either automatically at a given lower load limit or can be released under load.

One particular use of this type of equipment is the support of survival capsules or lifeboats aboard ship and on drilling platforms. Survival capsules are essentially enclosed boats that are increasingly being used as replacements for lifeboats on commercial vessels, cruise ships and especially on drilling or other off-shore platforms. Even when stored, survival capsules and lifeboats are commonly supported by a cable on a hoist so that they may be loaded or entered and quickly lowered over the side of a ship or off the side of a platform.

Vessels of this type have particular need for a hook locking mechanism which cannot be released under load (that is, while the vessel is above the water) without substantial inconvenience and the requirement of conscious and deliberate steps to manually release the locking mechanism. This is accomplished by disengaging the coupling to the manual release drive means, typically a hand crank for driving the release mechanism, and stowing it in a location separate from the lock release drive mechanism. Thus it is not readily available to drive the release mechanism without a conscious effort by the operator who must retrieve it from stowage, transfer it to the vicinity of the drive mechanism and mount it in driving relationship thereon, all of which serves to eliminate the possibility that the vessel will be released under conditions when it is not clearly in the water and ready for release from the cable.

Conversely, it is extremely desirable that the same hook be capable of rapidly and simply releasing the lock mechanism, such as after reaching the water, without disturbing the safety protection when under load. Further it is desirable that this operation be entirely controlled by the helmsman enabling him to determine the exact moment of release. Such a device should be automatic after the release of a safety pin or pins that, once removed, permit the automatic disengaging of the hook.

SUMMARY OF THE INVENTION

Embodiments of the present invention provide positive locking under load and automatic release of the lock when the load is decreased below a predetermined level and the safety pin is released. The hook portion of the present invention can be reloaded even in the locked condition and, additionally, has a separate safety pin to prevent unintended release of the hook.

In the apparatus, a hook and mounting structure are provided, normally on the top of a survival capsule. The unit is quite compact, and includes a housing which is usually a metal plate manufactured or bolted to the surface of the equipment to be lifted. Normally, the housing is provided with an independent servicing or hoisting flange having a circular opening for attaching to and lifting of the unit.

The main hook utilized as the connection between the hoisting system and the capsule, such as a cable and ring mounted on a crane or hoist, is rotatably pinned between the two plates which form the housing, and the housing is normally provided with a covering to prevent fouling or damage. The disengaging portion of the apparatus that actually contacts the cable or ring, including the shaped portion of the hook, is positioned in such a manner that, upon release and rotation of the hook, the face of the housing assists in the positive disengaging of the ring from the apparatus. A spring-biased, normally U-shaped pivotal lock is provided at the open end of the hook, and is positioned in such a manner that in its released condition it either contacts or comes very close to contacting the small pointed end of the hook in the structure and prevents the ring, when in position, from accidentally being separated from the hook. The biasing means is positioned such that the securing function can be overcome easily by pressure during inserting of the ring, but cannot be overcome by the reverse motion.

The hook itself has a pivot point positioned such that the engaging surface for the hook and the housing cooperate to produce a normally substantially vertical relationship between the pivot point of the hook and the contact point of the attaching ring with the hook surface. In addition, the engaging surface is designed such that the surface forms a constant radius arc, independent of rotation of the hook, about the pivot point of the hook. The hook is laterally extended away from the engaging surface a substantial amount in order to form a counterweight which is effective to rotate the hook under light-load conditions which are predetermined during design of the hook. The lateral extension is provided with a pin-attaching point which is pivotally attached to a first link. The opposite end of the first link is pivotally attached to one end of a second link, and the other end of the second link is attached to a shaft that pivots in apertures provided in the housing or other fixed structure. The two links, in conjunction with the hook, thus, form a three-piece linkage having four pivot points, the two outside pivot points being in fixed positions. As a result, when the linkage is free to rotate and the load at the hook engaging surface is sufficiently small, the load will be overcome by the weight of the lateral extension of the hook, and the hook will automatically rotate. However, when the hook is under a heavier load, the counterweight will not overcome the load and locking engagement will be retained.

An adjustable stop pin is provided adjacent one of the links to positively position the two links slightly before center so that automatic release under light loads will occur. Additionally, an independent safety locking structure is preferably provided. The independent structure normally comprises a pin which is spring-biased into a locked position and prevents one of the links from moving while it is locked. Normally the pin is positioned to block motion of the links, and positive action by the operator is required to unlock the safety pin before the hook mechanism can be released.

In operation, the hook is placed in its locked position, and a ring is placed through the exposed portion of the hook. The external spring-biased safety structure prevents the hook from becoming disengaged upon accidental loss of tension in the cable supporting the ring and the remaining portions of the apparatus are locked in position (a) by virtue of the locking pin, if in position, and (b) the placing of a load on the ring. The links tend to remain in their extended condition under the load until such time as the load becomes sufficiently small, according to design, that the weight of the hook extension tends to move the links about their pivot axes. When the vessel is in the water and ready for release, the operator releases the safety pin, thereby unblocking the links and rotation is then initiated by the weight on the hook and continues until such time as the hook disengages the ring contained therein.

BRIEF DESCRIPTION OF THE DRAWINGS

A better understanding of the present invention may be had from a consideration of the following detailed description, taken in conjunction with the accompanying drawings in which;

FIG. 2 is a side elevation assembly view of the hook;

FIG. 3 is a sectional view taken along lines 3—3 of FIG. 2;

FIG. 4 is a schematic of the linkage connection in both the engaged and disengaged positions.

DESCRIPTION OF THE PREFERRED EMBODIMENTS

Figure 1:
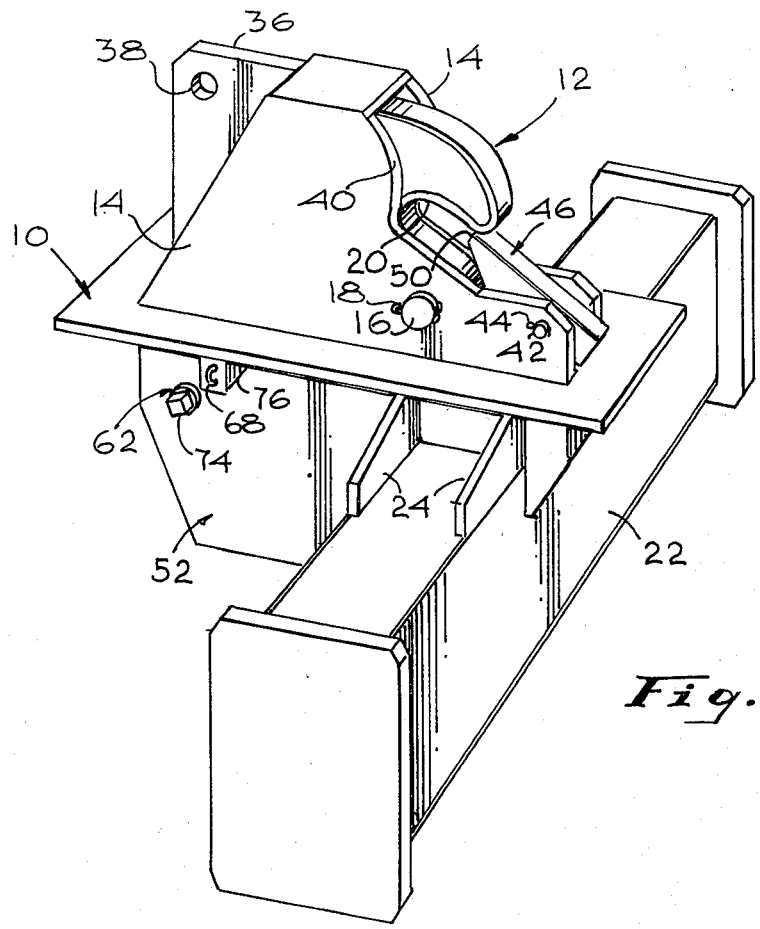
FIG. 1 is a perspective view of the hook structure as it would be mounted on a capsule.

The basic structure of the disengaging apparatus of the present invention is shown in FIG. 1. The apparatus may be used for many different purposes, such as boat or glider towing apparatus, a permanently attached hook on the upper portion of large equipment for moving and servicing such equipment, for survival capsules, lifeboats and the like. The present disclosure will describe the disengaging apparatus in relationship to its operation as the release mechanism for a survival capsule. In this context, the housing, or other structure utilized to position the apparatus is shown as 10. The actual hook, shown generally as 12, is positioned in a pair of vertical plates 14, by means of shaft 16 and cotter pin 18 such that hook 12 is capable of rotating about shaft 16. Engaging area 20 of the hook is normally provided with a specific shape, as better shown in FIG. 2.

One or both of plates 14 is provided with an extension 36 which is drilled to form hole 38 utilizable for hauling, hoisting or otherwise positioning the equipment attached to the disengaging apparatus herein, or for any other emergency or similar uses. Plates 14, positioned on either side of hook 12, are each provided with a release surface 40 which is vertically extended and preferably curved relatively toward the rearward portion of hook 12, and during disengagement acts to positively disengage the ring or other structure held by hook 12 on its engaging surface 20. Additionally, at its forward end, each plate 14 is drilled, and pin 42 and related cotter pins 44 are provided to position U-shaped safety latch 46 which is spring-biased by spring 48 (shown in FIG. 2) in a manner such that the forward end of latch 46 is normally in contact with housing 10. In this manner, the hook, when in the locked position, as shown, can be engaged with a hoisting ring or other structure by passing the ring between hook 12 and latch 46, overcoming the tension of spring 48. The spring would then bias latch 46 back to its relatively closed position, such that the end 50 of the latch 46 is in close proximity to the end of the hook. The whole of this external structure, as described, is, with the exception of the hook and latch structure, preferably covered with an enclosure, not shown, in order to protect it from the elements when used on board ship. Plates 14 extend through housing 10 to form lower support structure 52, and are attached to tubular support 22 and support webbing 24.

As particularly shown in FIG. 2, hook 12 is supported on housing 10 by plates 14. Shaft 16 rotatably mounts hook 12 between the plates. One of the plates is provided with extension 36, which is drilled to form hole 38 and thus provide a maintenance and/or service connection for the unit. The hook is shown in its engaged position, with pin 42 positioning U-shaped safety latch 46, which is biased by spring 48. Plates 14 extend to form lower support structure 52 and are braced to housing 10 through webbing 24 which is also attached to tubular support 22. In this manner, the whole of the disengaging apparatus of the present invention is positively attached in position on the survival capsule (see FIG. 5).

Hook 12 is shown engaged with ring 26 and, as can be seen in FIG. 2, in the engaged position ring 26 is substantially vertically aligned with pin 16 for pivoting the hook about pin 16. In addition, engaging surface 20 is arcuate and is formed at a constant radius from the pivot point of hook 12 about shaft 16. Hook 12 is laterally elongated to form extension 28 having recessed surface 30, as better shown in FIG. 3. Recessed surface 30 is drilled to form hole 32 for mounting of the links of the unit. The hook is also shaped along its outer surface 34 such that upon rotation the hook does not bind on housing 14 or the other supporting structures.

First link 54 is formed of two separate sections (see FIG. 3), which may be joined together in part, and positioned and attached to hook 12 through hole 32 by cotter pin 70 and pin 56. At its opposite end first link 54 is rotatably pinned to second link 58 through pin 60 such that link 54 is free to rotate about pins 56 and 60. Both of these pins are also free to move within the structure, unlike hook pivot shaft 16. Second link 58 is attached to shaft 62 which is rotatably positioned in lower support structure 52 by a cotter pin or the like. In this manner, link 58 is not free to move within the structure but may only rotate about the axis of shaft 62 when shaft 62 rotates.

Adjustable threaded stop 64 is provided through rear housing cover 66 to adjustably position the travel of link 58 so that it is stopped short of center. Thus when the load on the hook is released the links will rotate relatively inwardly about the pivots points fixed by the axes of pins 60 and 62. If it is desired to have a positive lock and prevent motion of the linkage, then stop 64 can be withdrawn to the point that links 54 and 58 rotate slightly over center and thus any upward motion at engaging area 20 of hook 12 would tend to force link 58 against stop 64 and affirmatively lock hook 12 in position. However, for ease of rotation of hook 12 under light load at release, it is preferred that stop 64 be positioned such that the centers of the two links are almost in a straight-line relationship, but not quite. In this format, safety latch pin 68 (shown in more detail in FIG. 3) is positioned, once the hook is engaged, in order to affirmatively lock link 58 in position and prevent motion of the linkage and rotation about the pins. In this format when the hook is to be disengaged, rotation of shaft 62 causing rotation of link 58 can be effected externally, as better shown in FIG. 3.

In FIG. 3, the section taken along lines 3—3 of FIG. 2, the preferred structure of the linkage of the disengaging apparatus of the present invention is more clearly depicted. In the figure, plates 14 are attached to housing 10 and project through housing 10 to form lower support structure 52. Hook 12 is rotatably affixed to plates 14 through shaft 16 which is held in place with cotter pin 18. Lateral hook extension 30 is pinned to link 54 through pin 56 and cotter pin 70. As shown, link 54 is formed of two pieces. However, the two pieces may be centrally joined, so long as motion of the system is not inhibited. First link 54 is rotatably attached to second link 58 through pin 60 which is held in position by cotter pin 72. Second link 58 is fixedly attached to shaft 62 which is allowed to rotate in lower support structure 52. Shaft 62 is also provided with bolt cap 74 or other rotating means for manual operation of the linkage. In this manner, rotation of shaft 62 by attaching a wrench to bolt cap 74 will either disengage or engage the hook, depending upon the direction of rotation.

Pin 68 is positioned through one of plates 14 to engage link 58. Safety latch pin 68 is provided with its own housing 76 and projects therethrough in two places. It is spring-loaded by spring 78 riding against housing 76 and cup 80 such that when pin 68 is grasped and pulled spring 78 is compressed, and when the free end thereof is rotated after pulling, the pin is held outward in the released position. Otherwise, the spring tensions safety latch pin 68 into the position against or adjacent link 58. In this manner, the pin, when placed in the position shown, will retain hook 12 in position and prevent accidental disengagement of the apparatus. However, when removed, the apparatus may either rotate by virtue of the counterbalance provided by extension 28 of the hook (shown in FIG. 2) or by virtue of rotation of shaft 62 through turning of bolt head 74.

In FIG. 4, the two positions, i.e. engaged and disengaged, of the hook of the present disengaging apparatus are shown. The engaged position is shown in the normal form, with the disengaged position shown as broken lines. Keeping in mind that shafts 16 and 62 are fixed in position, but allow the hook and the two links to move and rotate, it can be seen that in the engaged position hook 12 has its engaging surface 20 against ring 26 which is substantially vertically aligned with the axis of shaft 16. In this form, links 54 and 58 are both extended upwardly to almost their full extent, i.e. pins 56 and 60 and shaft 62 are approximately aligned. When the load is below a predetermined level, as determined by the moment produced by the mass of hook extension 28, links 54 and 58 fold upon themselves, moving pin 60 in a downward counterclockwise direction, while the weight of hook 12 causes it to rotate about shaft 16, releasing the ring from engagement. In order to facilitate this, as previously described, engaging surface 20 is provided at a constant radial distance from the axis of shaft 16. Of course, the desired automatic release load for the apparatus of the present invention can be controlled by varying the moment produced by hook 12, i.e. by varying the mass of hook 12 and the distance between shaft 16 and pin 56.

Figure 5:
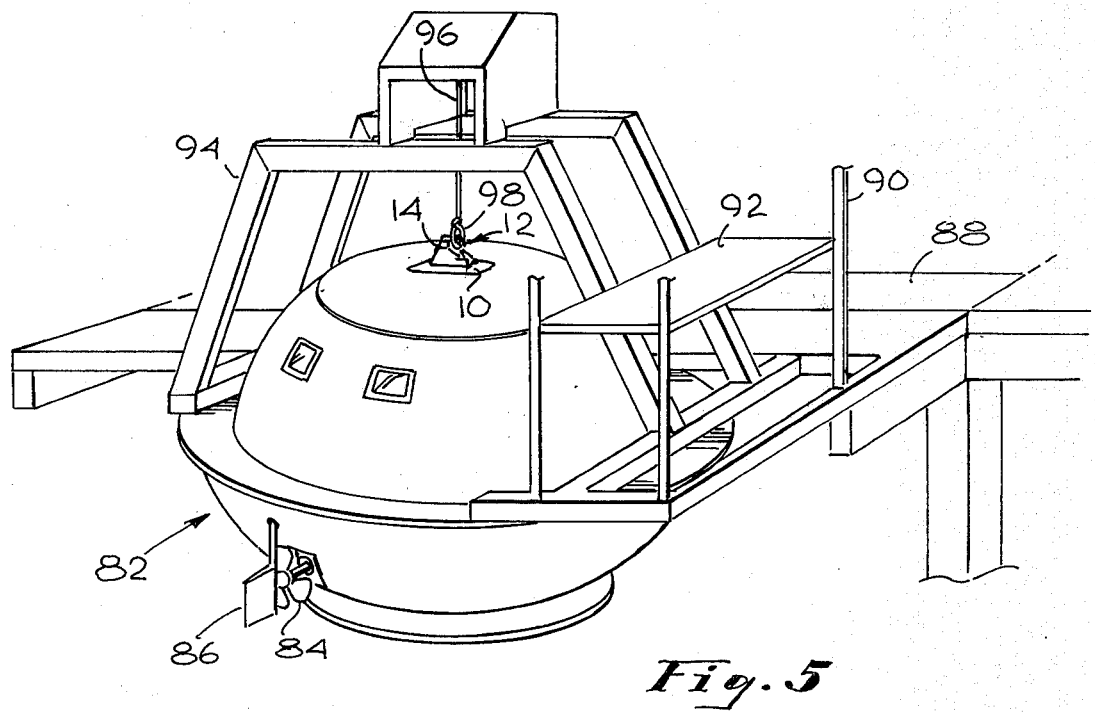
FIG. 5 shows a hook on a capsule in position.

As depicted in FIG. 5, an exemplary survival capsule, indicated generally as 82, is provided with hook 12 positioned between plates 14 on housing 10, located at the top of the capsule. The capsule has a propeller 84 and rudder 86, and can be entered through a hatch, not shown, approached from decking 88. Scaffolding 90 provided with second deck 92 is also used around support beams 94 which typically position a hoisting motor such as a conventional electric winch provided with a suitable amount of cable on a drum, all of which is omitted for clarity of illustration. The cable 96 is provided with eye 98 which is positioned and held in place by the disengaging apparatus of the present invention. During storage, survival capsule 82 is hoisted by the winch to a position where movement does not occur due to tension provided by contact of the survival capsule with the scaffolding structure. For testing or use the winch drive is activated and the gearing engaged to lower the capsule. On approaching or upon reaching the water, and when the helmsman is ready to cast off from the cable, the helmsman moves the safety pin out of the blocking position for the linkage. Since the tension on cable 96 is released by the bouyancy of survival capsule 82, the counterweight of the hook rotates it and the disengaging apparatus of the present invention operates to release the survival capsule from the cable.

Although there have been described above one specific arrangement of disengaging apparatus in accordance with the invention for the purpose of illustrating the manner which the invention may be used to advantage, it will be appreciated that the invention is not limited thereto. For example, although the invention has been disclosed in the context of a disengaging apparatus for a particular survival capsule, the apparatus could be utilized for other equiment without the principles of the invention being rendered inapplicable. Accordingly, any and all modifications, variations or equivalent arrangements which may occur to those skilled in the art should be considered to be within the scope of the invention as defined by the appended claims.

What is claimed is:

1. Disengaging apparatus comprising:
   a releasable hook pivotable about a pivot and including a contact surface rotatable about said pivot and an off-center moment-producing extension containing linkage engaging means, said hook being rotatable between first engaging and second disengaging positions;
   a housing including means for positioning said hook for rotation about its pivot;
   a first link pivotably mounted in said housing at one end and pivotable between first and second positions, respectively, to control rotation of the hook between said engaging and disengaging positions;
   a second link pivotably coupled to the first link and to the linkage engaging means of said hook for rotating the hook about its pivot axis; and
   stop means for stopping movement of the first and second links short of straight line orientation when the hook is in the engaged position.

2. The apparatus of claim 1 wherein the housing substantially encases the hook.

3. The apparatus of claim 1 wherein the mass of the hook extension produces a rotational moment urging the hook toward the second position and disengaging the hook for loads less than a predetermined load.

4. The apparatus of claim 3 further comprising independent locking means effective to prevent motion of the links.

5. The apparatus of claim 4 wherein the independent locking means comprises a J-shaped pin spring-biased toward engagement with one of the links.

6. The apparatus of claim 1 wherein the stop means is adjustable to prevent the links from pivoting over-center.

7. The apparatus of claim 1 wherein the housing is shaped to clear the hook as the hook is rotated to the second position.

8. The apparatus of claim 1 further comprising release means effective to selectively release the hook from the first position.

9. The apparatus of claim 8 wherein the release means includes rotatable means coupled to the first link.

10. The apparatus of claim 1 further comprising spring-biased latch means effective to allow engagement of a cable to the hook and prevent disengagement when the hook is in its first position.

11. Disengaging apparatus comprising:
    a frame mounted on a support member, said frame including vertically oriented, spaced apart, support plates;
    a first link pivotably mounted between the plates, said link being pivotably supported by said plates to permit rotation of the first link between first and second positions, respectively, and permit rotation of a hook;
    a releasable hook pivotably supported between the plates adjacent the first link, the hook having an elongate counterweight extension projecting from the pivot thereof, the hook being free to rotate from a first closed position to a second open position in which the hook is retracted between the plates upon movement of the first link from the first to the second position;
    a second link interconnecting the first link and the extension of the hook for controlling rotation of the hook between said first and second positions; and
    means for maintaining the first and second links short of straight line alignment when the first link is in said first position, whereby the links are prevented from locking under load in said first position.

12. The apparatus claim 11 wherein the second link is pivotably connected between the first link and the counterweight extension of the hook, and wherein the counterweight extension is selected to rotate the first link from the first to the second position when the load on the hook drops below a predetermined level.

13. The apparatus of claim 12 further comprising release means coupled to the first link and effective to rotate the link and hook irrespective of the load on the hook.

14. The apparatus of claim 11 further comprising lock means for selectively retaining the hook in the first position.

15. The apparatus of claim 14 wherein the lock means includes a spring-biased pin.

16. The apparatus of claim 11 wherein the plates include means for clearing the hook as the hook retracts between the plates.

17. The apparatus of claim 11 further comprising spring-biased latch means effective to allow engagement of a cable to the hook and prevent disengagement when the hook is in its first position.

18. The apparatus of claim 11 wherein the link maintaining means is adjustable to prevent the links from pivoting over-center.

* * * * *